April 6, 1965  F. L. RAYNAK  3,177,357
HEADLAMP ADJUSTING APPARATUS
Filed April 25, 1962
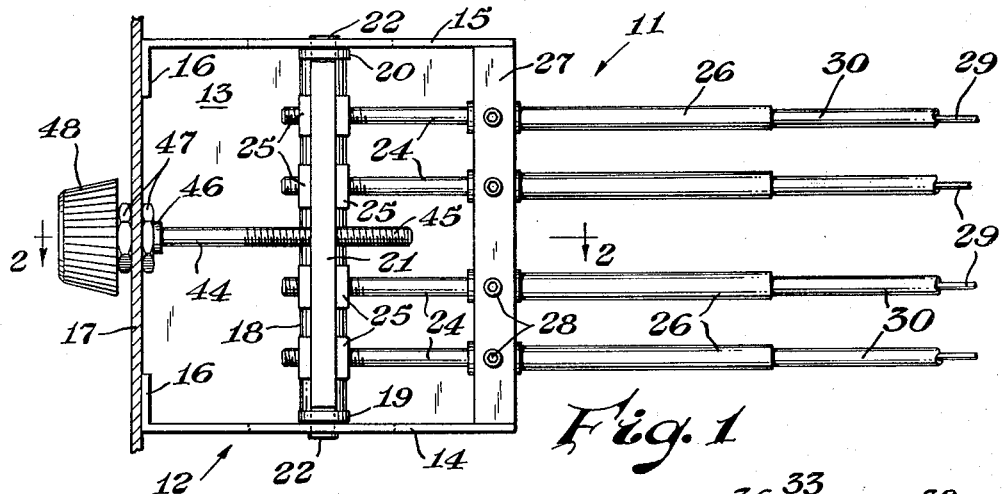
Fig. 1
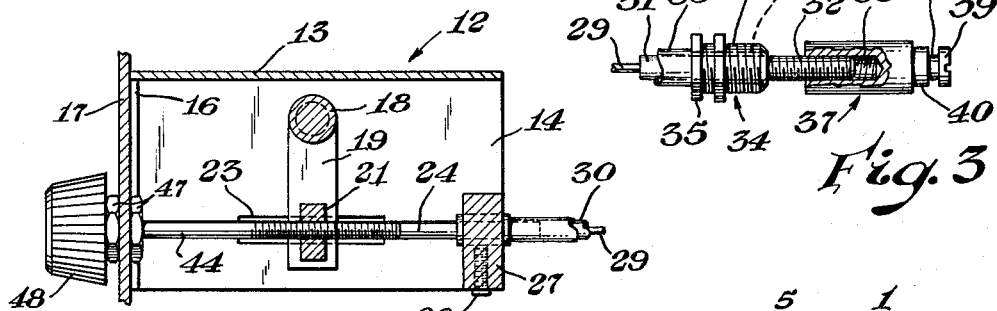
Fig. 2
Fig. 3
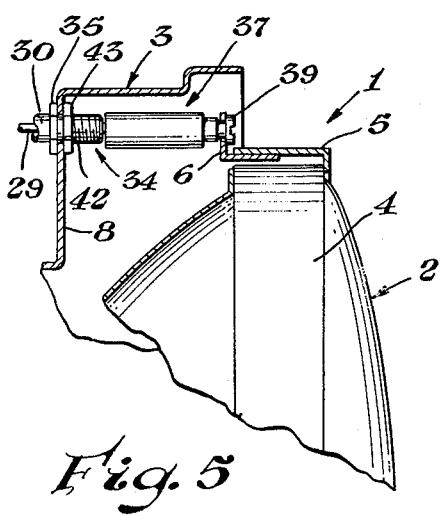
Fig. 5
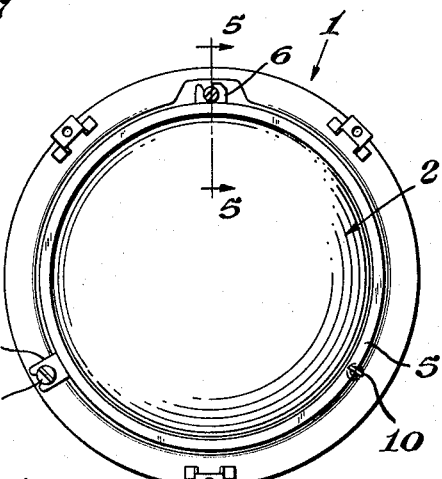
Fig. 4
INVENTOR.
Frank L. Raynak
BY
Learman, Learman & McCulloch
ATTORNEYS United States Patent Office 3,177,357
Patented Apr. 6, 1965

3,177,357
HEADLAMP ADJUSTING APPARATUS
Frank L. Raynak, Greenbush, Mich., assignor of one-half to Phyllis B. Raynak, Greenbush, Mich.
Filed Apr. 25, 1962, Ser. No. 190,115
6 Claims. (Cl. 240—41.6)

This invention relates to headlamp adjusting apparatus and more particularly to apparatus operable to enable the driver of a vehicle to adjust the vehicle's lights from his seat so as to compensate for varying loading conditions to which the vehicle may be subjected.

The headlamps of vehicles are adjustably mounted to enable the light beams to be adjusted according to the desires of a vehicle driver. Although the headlamps are adjustable, once they have been set in an adjusted position it is not an easy task to readjust them, inasmuch as adjustment of the headlamps usually requires the removal of certain parts of the headlamp mounting assembly. Because of the difficulty in effecting adjustment of headlamps, it is rather common for the typical owner of a passenger car, for example, to have his vehicle's headlamps adjusted at a service station or the like when the vehicle is either empty or containing only one or two passengers. Should such a vehicle subsequently be used at night and be more heavily loaded, the headlight beams may be directed upwardly, rather than downwardly toward the road. This is disadvantageous for two reason: Firstly, upward inclination of the headlight beams may cause blinding of oncoming drivers. Secondly, upward inclination of the headlight beams may reduce the illumination of the road ahead. In either case, the inability of the headlamps to be adjusted conveniently to compensate for varying load conditions can be dangerous.

An object of this invention is to provide headlamp adjusting mechanism that is operable by the vehicle driver from inside the vehicle to compensate for varying load conditions of the vehicle.

Another object of the invention is to provide headlamp adjusting mechanism of the character referred to which is simple to operate and which positively locks the headlamps in adjusted position.

A further object of the invention is to provide apparatus which is capable of adjusting all of a vehicle's headlamps simultaneously and to the same extent.

Another object of the invention is to provide headlamp adjusting mechanism which is adapted for use as original equipment or as a modification for existing vehicles, or both.

Still a further object of the invention is to provide headlamp adjusting mechanism which requires no modification of present headlamp assemblies, other than the drilling of a hole.

Other objects and advantages of the invention will be pointed out specifically or will become apparent from the following description when it is considered in conjunction with the appended claims and the accompanying drawing, in which:

FIGURE 1 is a fragmentary, partly sectional and partly bottom plan view of part of the adjusting mechanism;

FIGURE 2 is a sectional view taken on the line 2—2 of FIGURE 1;

FIGURE 3 is a fragmentary view of another portion of the adjusting mechanism;

FIGURE 4 is a front elevational view of a typical headlamp and mounting assembly; and FIGURE 5 is an enlarged sectional view taken on the line 5—5 of FIGURE 4.

Apparatus constructed in accordance with the invention is adapted for use with conventional headlamp assemblies of the kind disclosed in FIGURES 4 and 5 and comprising a headlamp unit 2 of conventional construction that is mounted within a support or housing 3, also of conventional construction, for movements relative to the housing. As is customary, the lamp unit 2 includes an annular flange 4 against which bears a ring member 5, the latter having a pair of brackets 6 and 7 secured thereto by suitable means such as welding. The housing 3 has a back wall 8 provided with a nut or the like (not shown) into which is threaded an adjusting screw 9, the screw 9 passing through the bracket 7 to secure the ring 5 against the flange 4. The ring 5 also is provided with an opening in which one end of a tension spring 10 is removably received, the other end of the spring being anchored to a lug (not shown) mounted on the housing 3.

In conventional headlamp assemblies a screw extends through the bracket 6 and is threaded into a nut or the like fixed to the rear wall 8 of the housing to provide a third anchor point for the ring 5, and such screw is adjustable to cause the headlamp 2 to be rocked about a substantially horizontal axis so as to raise or lower the headlight beam. In apparatus constructed in accordance with the invention, however, the screw that ordinarily passes through the bracket 6 is replaced by the headlight adjusting mechanism yet to be described.

In the disclosed embodiment the headlamp adjusting mechanism is designated generally by the reference character 11 and comprises a generally U-shaped housing 12 having a top wall 13 and a pair of side walls 14 and 15 terminating in flanges 16 at corresponding ends which may be welded, bolted, or otherwise suitably secured to the dashboard 17 of a vehicle. Journaled at its opposite ends in the walls 14 and 15 is a transversely extending shaft 18 adjacent opposite ends of which is fixed a pair of arms 19 and 20. Spanning the distance between the arms 19 and 20 is a bar 21 terminating at each end in a cylindrical projection 22 that is rotatably journaled in the adjacent arms 19 and 20. Each projection 22 is of such length as to extend through a slot 23 provided in each wall of the housing.

Some of the vehicles currently in use have four headlamps, whereas others have only two headlamps. Apparatus constructed in accordance with the invention is adapted for use with either type vehicle and, as illustrated, the invention is adapted for installation on a vehicle having four headlamps.

The headlamp adjusting means also includes a plurality of actuating rods 24, each of which extends through the bar 21. Corresponding ends of the rods 24 are threaded and receive nuts 25 or the like by means of which each rod may be adjusted individually relatively to the bar 21 and locked in adjusted position. The other end of each rod 24 extends into a sleeve 26 that is supported in a cross member 27 which is secured to the housing walls 14 and 15. Each sleeve is removably fixed to the member 27 by a set screw 28 or the like.

Each of the actuating rods 24 is fixed to a wire 29 that is slidable within a sheath 30 which, in turn, is supported within the sleeve 26. Each of the wire and sheath assemblies constitutes what is known as a Bowden cable.

The adjusting mechanism for each headlamp also includes a cylindrical rod 31 (FIGURES 3 and 5) which is fixed at one end to a Bowden wire 29 and extends beyond the terminal end of the sheath 30. The free end of each rod 31 is threaded as is indicated at 32. Each rod 31 slideably extends through a bore 33 formed in a clamp member 34 having an enlarged head 35 at one end and an exteriorly threaded shank 36. The threaded end 32 of the rod 31 is received in a correspondingly threaded opening 36 formed in one end of another clamp member 37. The other end of the clamp 37 is shaped to form a reduced neck portion 38 between an enlarged head 39 and a shoulder 40.

Each pair of clamp members 34 and 37 forms part of the adjusting mechanism and is adapted to react between the housing 3 and the clamping ring 5 so as to enable the associated headlamp to be adjusted. To enable the apparatus to function in this manner, the rear wall 8 of each headlamp housing 3 may be provided with an opening 42 to accommodate the associated clamp member 34 and the latter may be inserted in the opening and be maintained fixed relative to the housing by the reaction between the head 35 and a nut 43 threadedly mounted on the member 34. The member 37 then may be adjusted relatively to the threaded rod 31 so as to enable the reduced neck portion 38 to receive the bracket 6. The arrangement is such that longitudinal reciprocating movement of a member 37 will effect rocking movement of the associated headlamp 2 about a substantially horizontal axis and, since the bracket 6 is trapped between the portions 39 and 40 of the member 37, the headlamp 2 will be fixed in any selected position of adjustment.

Means is provided for operating the headlamp adjusting mechanism and comprises a rotatable shaft 44 having a threaded portion 45 that extends through a correspondingly threaded opening formed in the actuating bar 21. The other end of the shaft 44 extends through a bearing 46 that is mounted in an opening formed in the dashboard 17 and retained in fixed relation by a pair of lock nuts 47. A knob 48 may be fixed on the shaft 44 to facilitate its rotation.

In the operation of the apparatus, rotation of the shaft 44 will cause the actuating bar 21 to move in one direction or another in the slots 23 formed in the housing walls 14 and 15. Such movement of the actuating bar 21 will cause corresponding movement of all of the rods 24 and movement of the rods will be transmitted by the Bowden wires 29 to all of the rods 31 so as to effect extension or retraction of the clamp parts 34 and 37. If the clamp parts 34 and 37 are extended, the headlamps 2 will be rocked in such direction as to cast their beams downwardly. Retraction of the clamp members 34 and 37 relatively to one another will cause the headlamp beams to be cast upwardly. Regardless of the position to which the headlamps 2 are adjusted, the threaded connection of the actuating shaft 44 with the actuating bar 21 serves to provide a positive lock against creeping adjustment of the headlamps.

It is not necessary that the housing 12 be mounted directly adjacent the dashboard 17. The housing could be mounted at any part of the vehicle and a Bowden cable or other flexible connection interposed between the shaft 44 and the operating knob 48.

Although only one headlamp 2 has been disclosed in the drawing, it should be understood that each of the Bowden cables of the operating mechanism is connected in a similar manner to a similar headlamp.

A particular advantage of the disclosed construction is that the headlight adjusting mechanism may be incorporated in vehicles either as part of the original equipment or as an additional accessory. In either case, the headlamp mounting and adjusting means with which conventional headlamp assemblies are provided require no modification other than the provision of an opening 42 in the housing 3 and substitution of the clamp parts 34 and 37 for the beam adjustment screw with which such conventional headlamp assemblies are provided.

The disclosed embodiment is representative of a presently preferred form of the invention but is intended to be illustrative rather than definitive thereof. The invention is defined in the claims.

I claim:

1. Adjusting apparatus for a headlamp comprising a support; a headlight, means mounting said headlight on said support for rocking movements about a substantially horizontal axis; first clamp means clamped on said support; second clamp means clamped on said headlight; adjusting means slideably supported by one of said clamp means and fixed to the other of said clamp means; and actuating means operatively connected to said adjusting means for effecting sliding movements of said adjusting means relative to said one of said clamp means to cause said first and second clamp means selectively to move toward and away from one another and rock said headlight about said axis.

2. The apparatus set forth in claim 1 wherein said actuating means comprises an elongated, longitudinally movable member; and operating means connected to said member remote from said clamp means for moving said member longitudinally.

3. The apparatus set forth in claim 2 wherein said operating means includes means for releasably locking said elongated member in adjusted position.

4. The apparatus set forth in claim 2 including adjustable means reacting between said member and said operating means for adjusting the relative positions of said member and said operating means.

5. Headlamp adjusting apparatus comprising a housing; a headlamp; means mounting said headlamp on said housing for rocking movements about a substantially horizontal axis; clamp means having a first part fixed to said housing and a second part fixed to said headlamp; adjusting means interconnecting said first and second parts operable to move said parts relatively to one another to rock said headlamp about said axis; and actuating means connected to said adjusting means for operating the latter.

6. Headlamp adjusting apparatus comprising a support; a headlamp having peripheral flange means thereon; means mounting said flange means on said support for conjoint rocking movements of said flange means and said headlamp about a substantially horizontal axis; first clamp means secured to said support and offset from said axis; second clamp means secured to said flange means and aligned with said first clamp means; adjusting means interconnecting said first and second clamp means for effecting relative movement thereof to rock said headlamp and flange means about said axis; and actuating means connected to said adjusting means for operating the latter.

References Cited in the file of this patent

UNITED STATES PATENTS

| | | |
|---|---|---|
| 1,617,463 | Sineath | Feb. 15, 1927 |
| 2,445,602 | Casaroll | July 20, 1948 |